Patented Aug. 5, 1947

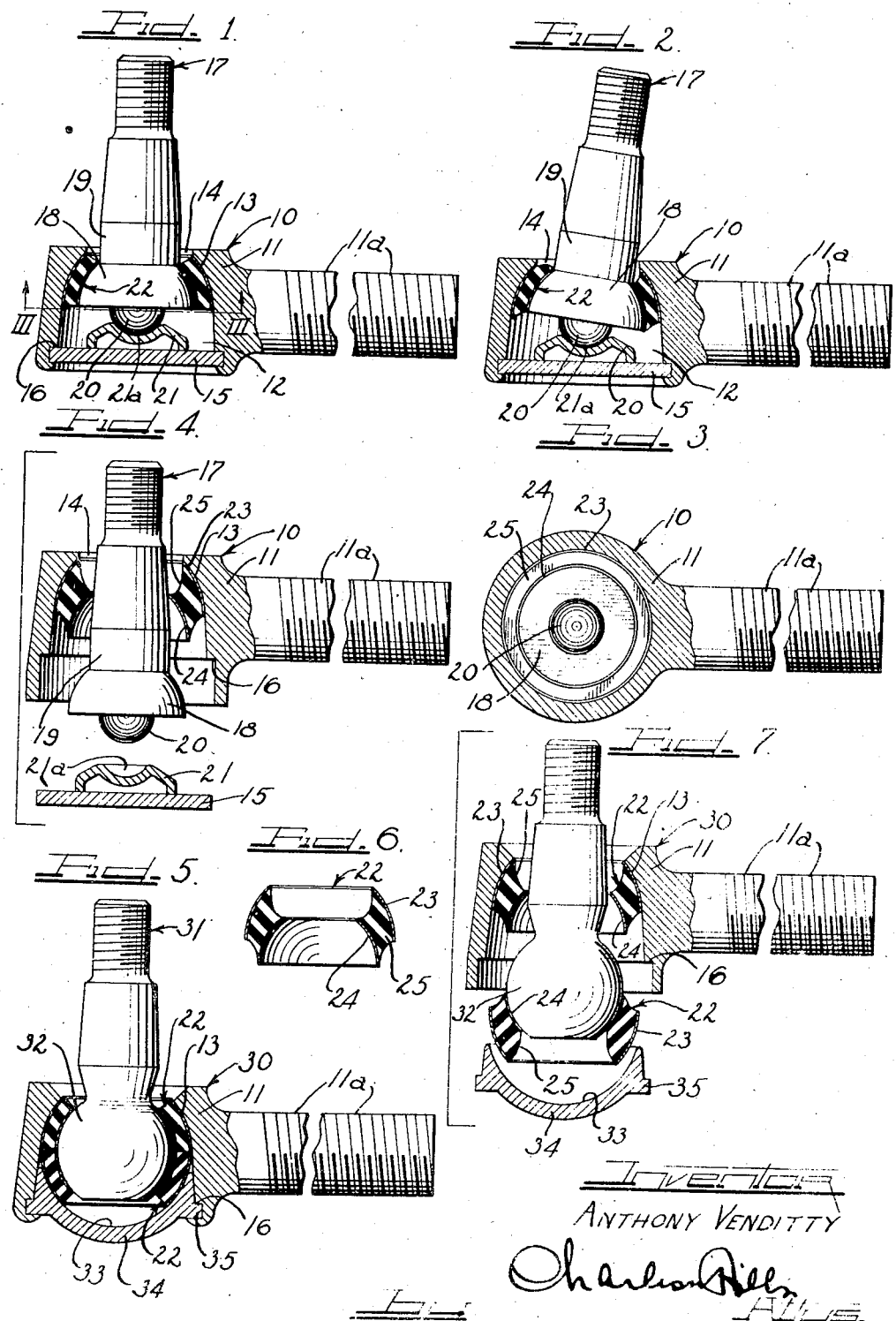

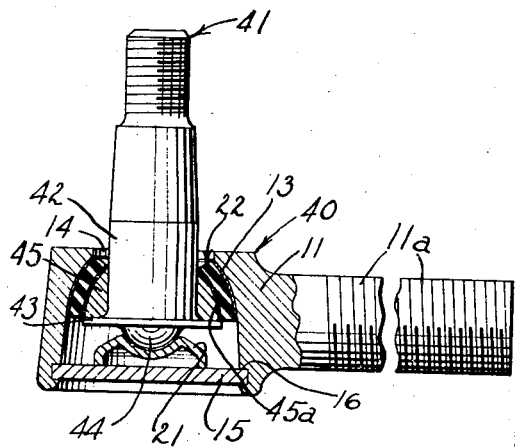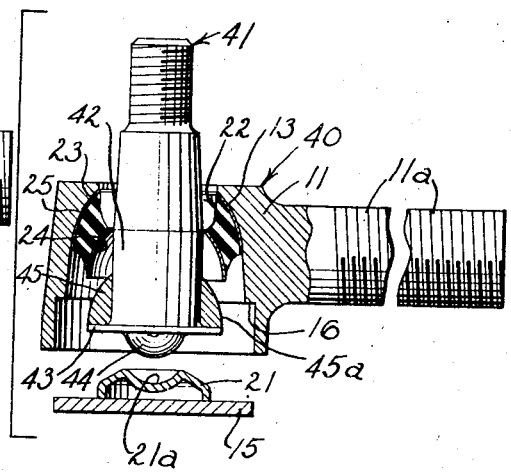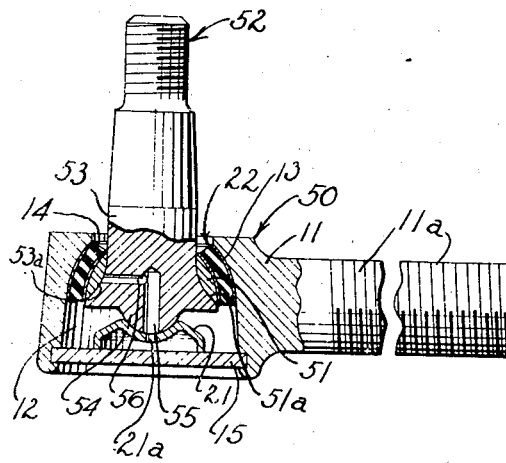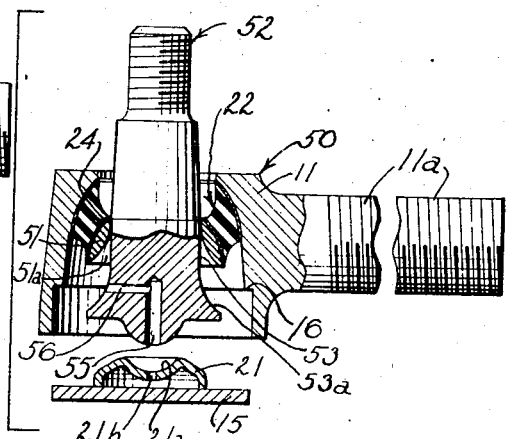

2,425,138

UNITED STATES PATENT OFFICE 2,425,138

RUBBER BUSHED TIE ROD JOINT

Anthony Venditty, Detroit, Mich., assignor to Thompson Products, Inc., a corporation of Ohio Application October 30, 1941, Serial No. 417,078

9 Claims. (Cl. 287—85)

This invention relates to joints utilizing resilient bushing material both as a road shock absorber and as an automatic wear take-up means in order that usual spring-type wear take-up assemblies can be dispensed with.

More specifically the invention relates to tie rod type joints having the headed ends of the joint studs seated in a bearing shell which is urged into proper bearing engagement by a surrounding resilient bushing mounted in the socket on an outer shell.

While the invention will hereinafter be particularly described in connection with tie rod type joints, it should be understood that the principles of the invention are applicable to any type of joint assembly accommodating relative movements between the parts thereof.

In tie rod type joints it is customary to utilize a coiled spring mounted in the socket under compression for urging the stud and related bearing parts into proper bearing engagement. According to this invention, the usual coil spring is now eliminated, and automatic wear take-up of the bearing parts is accomplished by means of a resilient bushing such as a rubber bushing.

The rubber bushing will also absorb road shock to dampen out vibration from the wheels through the steering assembly to the steering wheel. However, since the rubber is loaded in the joint socket and since it is limited in thickness, "mushy" steering will not result. If thick blocks of unloaded rubber are used in tie rod joint bushings, they will cause lost motions in the steering assembly and "soft" or "mushy" steering will result.

In accordance with the invention the rubber bushing, or a plurality of such bushings, is vulcanized to inner and outer shells preferably formed of self-lubricating metal such as graphited bronze or the like. It should be understood, however, that the shells can be composed of any metal, or that non-metallic woven fabric material can be used. The bushing holds the inner and outer shells in spaced relation and is deformed by the socket closure plate into a stressed position with the shells in closer relation. The bushing, when so stressed, tends to reclaim its unstressed position and, in so doing, urges the bearing parts into proper bearing position and automatically takes up any wear developed in the parts.

The outer shell is seated on a complementary-shaped wall of the socket and the inner shell is seated on a complementary-shaped bearing portion of the stud or stud assembly. The stud or stud assembly can rotate on its own axis within the inner bearing shell, or alternatively, can carry the shell and bushing assembly therewith to effect relative rotation between the outer bearing shell and the socket. The stud can tilt relative to the socket either through interparticle flow of the bushing material which further deforms the bushing, or by virtue of relative tilting movement between one or both of the shells and the socket or stud. When tilting is accomplished through interparticle flow of the bushing, the stud and socket member tend to return to their initial relative positions since the bushing tends to reclaim its original position.

It is, then, an object of this invention to eliminate the usual spring-type wear take-up devices in joints without sacrificing the wear take-up features of the joints.

A further object of the invention is to provide springless joints accommodating relative rotating and tilting movements between the parts thereof and having automatic wear take-up features.

A further object of the invention is to provide tie rod type joints having resilient bushing material acting as a wear take-up means for the bearing parts.

A still further object is to provide rubber bushed joints for automotive steering assemblies which will absorb road shock without producing "mushy" steering effects.

A further object of the invention is to provide tie rod joints accommodating relative tilting and rotating movements between the stud and socket parts thereof wherein inner and outer bearing shells are resiliently urged apart by a rubber bushing into full seating engagement with stud and socket parts respectively.

A specific object of the invention is to provide tie rod points with deformable rubber bushings fixedly secured to inner and outer bearing shells.

Other and further objects of the invention will become apparent to those skilled in the art from the following detailed descriptions of the annexed sheets of drawings which, by way of preferred examples, illustrate several embodiments of the invention.

On the drawings:

Figure 1 is a broken side elevational view, with parts shown in vertical cross section, of a tie rod joint according to this invention.

Figure 2 is a view similar to Figure 1 but illustrating the joint stud in tilted position.

Figure 3 is a broken horizontal cross-sectional view, with parts in elevation, taken along the line III—III of Figure 1.

Figure 4 is an exploded vertical cross-sectional view with parts broken away and in side elevation, of the joint shown in Figures 1 to 3.

Figure 5 is a broken side elevational view with parts in vertical cross section, of a ball and socket joint according to this invention.

Figure 6 is a vertical cross-sectional view of the rubber bushed bearing shells used in the joints of this invention.

Figure 7 is an exploded side elevational view with parts shown in vertical cross section, of the ball and socket joint illustrated in Figure 5.

Figure 8 is a broken side elevational view with parts in vertical cross section, of another modified form of joint according to this invention.

Figure 9 is an exploded view of the joint parts shown in Figure 8.

Figure 10 is a broken side elevational view with parts in vertical cross section of still another modified joint according to this invention.

Figure 11 is an exploded view of the parts of the joint of Figure 10.

Figure 12 is a cross-sectional view similar to Figure 6 but illustrating another form of inner shell vulcanized to the rubber bushing.

As shown on the drawings:

In Figures 1 to 4 the reference numeral 10 designates generally a tie rod joint including a socket 11 having a laterally extending threaded shank portion 11a for threaded insertion into the end of a tie rod. The socket 11 defines a socket chamber 12 having a segmental spherical inner bearing wall 13 which converges inwardly to provide a reduced opening 14 at the top of the socket chamber. The bottom of the socket chamber 12 is closed by a plate or disk 15 which is spun or peened into the socket 11 against a shoulder 16 formed at the end of the chamber 12.

A stud 17 has a half-ball head 18 disposed in the socket chamber 12 and a shank portion 19 projecting freely from the socket chamber through the opening 14. A semi-spherical button end 20 of smaller diameter than the head 18 is formed integrally with the stud under the head 18 at the axial center of the stud.

A cap member 21 supported on the closure plate 15 has a segmental-spherical depression 21a in the head thereof receiving a portion of the button end 20.

In accordance with this invention, and as best shown in Figure 6, a bearing shell unit 22 is provided for disposal between the socket bearing wall 13 and the stud head 18. This unit 22 is composed of an outer segmental spherical metal shell 23, an inner segmental spherical metal shell 24 partially nested within the shell 23, and an interposed rubber ring or bushing 25. The shells 23 and 24 are integrally affixed to the inner and outer faces of the rubber bushing as by vulcanizing. The shells can be composed of lubricant-impregnated metal such as graphited bronze or any other bearing material. Alternatively the shells can be composed of flexible fabric material.

The inner shell 24 has an inner face receiving the head 18. The outer shell 23 has an outer face for seating on the bearing wall 13 of the socket.

When the joint parts are assembled as shown in Figure 4, the unit 22 is merely dropped into the socket so as to position the shell 23 thereof on the socket wall 13. The stud is next dropped into the inner shell 24 to seat the head 18 thereof in the shell. The cap member 21 is next disposed on the button end of the stud and the closure plate 15 is then forced against the shoulder 16 of the socket. This forcing of the stud effects deformation of the rubber bushing 25 from its unstressed position as shown in Figure 6 to the stressed position shown in Figures 1 and 2. The closure plate 15 is then spun into the socket as shown in Figures 1 and 2.

The deformation of the rubber bushing 25 by forcing the closure plate 15 against the shoulder 16 places the bushing under stress and it thus tends to urge the shells 23 and 24 apart thereby maintaining the shells in good bearing contact with the socket bearing wall 13 and the stud head 18 respectively. The stud is free to rotate about its own axis within the bearing shell 24 or, alternatively, can carry the unit 22 therewith to rotate the outer shell 23 on the socket wall 13.

Tilting movements of the stud relative to the socket are accommodated through further interparticle flow or stressing of the rubber as best illustrated in Figure 2. The stud carries the inner shell 24 therewith during tilting movements as the rubber is subjected to shear stresses which tend to reclaim the original untilted position of the stud.

Thus the stud is rotatable upon its own axis on a pair of bearing surfaces and is tiltable in all planes relative to the socket through stressing or further deformation of the rubber.

As the bearing parts wear down, the stressed rubber bushing immediately forces the shells into full bearing engagement with the worn surfaces and prevents any looseness from developing in the joints.

As a result, the usual coil spring interposed between a closure plate and a cap member is dispensed with. The rubber bushing not only acts as a wear take-up member but also as a tilting movement accommodating member.

In the ball and socket joint construction shown in Figures 5 and 7 parts substantially identical with parts described in Figures 1 to 4 and 6 have been identified with the same reference numerals.

The ball and socket joint 30 shown in Figures 5 and 7 has substantially the same socket 11 described in Figures 1 to 4. However, a stud 31 is provided with a substantially full ball end 32. A pair of bushing units 22 are used to encase the ball head 32 instead of the single unit 22 used in the construction of the joint shown in Figures 1 to 4. The pair of units 22 have the inner shells 24 thereof respectively receiving the top and bottom half-portions of the ball head 32. The inner shell 24 of the unit 22 which receives the upper half of the ball head 32 has the outer shell 23 thereof seated on the socket bearing wall 13. The outer shell 23 of the unit 22 receiving the lower portion of the ball end 32 is seated in the semi-spherical recess 33 of a closure cap 34. This closure cap 34 has an annular flange 35 which is forced against the shoulder 16 of the socket and peened into position as shown in Figure 5. Both of the rubber bushings 25 in the respective units 22 are thus deformed and held in stressed condition by the closure cap 34. This cap 34 has the recess-defining wall thereof cooperating with the socket wall 13 to form a substantially full ball seat for the outer shells 23. As shown in Figure 5 the inner and outer shells of the pair of units 22 are forced into abutting relation by the closure cap.

The ball stud is free to tilt and rotate about its own axis within the ball socket provided by the inner pair of bearing shells 24. Alternatively, of course, the outer pair of bearing shells 23 could accommodate such movements. Any wear developed on the bearing parts is automatically taken up by the stressed rubber bushings.

In the joint 40 disclosed in Figures 8 and 9, the socket member 11 is the same as the socket member described in connection with Figures 1 to 4. Likewise the bushing unit 22 is the same as previously described. However, a stud 41 is provided with a cylindrical bearing surface 42 bottomed by a radially extending flange or collar 43. The usual button end 44 is provided on the stud below the collar 43.

A bearing ring 45 of metal, plastic material, or the like is press-fitted onto the stud 41 around the cylindrical portion 42 thereof and against the flange or collar 43 thereof. This metal ring 45 thus frictionally embraces the portions 42 and 43 of the stud and travels therewith. The metal ring 45 has a segmental spherical outer bearing wall 45a for bearing engagement with the inner shell 24 of the bushing unit 22.

The joint 40 will operate in the same manner as the joint 10 described in Figures 1 to 4 and differs from the joint construction of Figures 1 to 4 mainly in the provision of a separate bearing ring in press-fitted relation to the stud. This bearing ring can conveniently be formed of a lubricant-impregnated metal such as "Oilite." In this modification tilting movement of the inner bearing shell 24 with the stud is insured by the abutment between the bottom of the shell and the flange 43 as shown in Figure 8. In the structure of Figures 1 to 4 the bearing shell 24 contacts the cylindrical neck 19 of the stud durduring tilting movements so that the shell is carried with the stud.

In the joint 50 shown in Figures 10 and 11 the same socket member 11 described in Figures 1 to 4 is used and parts thereof have been identified with the same reference numerals. The bushing unit 22 described above fixedly carries an inner bearing ring 51 in the inner shell 24 thereof. This bearing ring 51 can be spot-welded, soldered or otherwise fixedly secured to the shell 24. The ring 51 has an outer face of the same contour as the bearing shell and has a bell mouthed circular aperture 51a therethrough.

A stud 52 has a cylindrical portion 53 extending through the opening 14 of the socket and provided with a bell mouthed end 53a in the socket. This bell mouthed end 53a is shaped complementary to the aperture 51a of the bearing ring 51.

The usual button end 54 is provided on the stud under the bell mouthed portion 53a thereof. An axial bore 55 is drilled into the bottom end of the stud through the button end and into the bell mouthed portion of the stud as shown. A second bore 56 is drilled radially through the bell mouthed portion of the stud into communication with the bore 55.

The cap member 21 has a hole 21b drilled through the depressed portion 21a thereof. When the socket chamber 12 is packed with grease, the grease can enter through the aperture 21a, into the bores 55 and 56 for lubricating the bell mouthed bearing surfaces of the stud and bearing ring respectively.

The assembly is held in operative relation by forcing the closure plate against the shoulder 16 as described above and the stud 52 will rotate about its own axis on the bell mouthed bearing surfaces 51a and 53a. However, tilting movements of the stud are accommodated through interparticle flow of the rubber since the stud will carry the bearing ring 51 therewith during tilting movements and the bearing ring, being fixed to the inner shell 24 of the rubber bushing unit, will, of course, move therewith to further stress the rubber.

In the construction of Figures 10 and 11, therefore, a pair of lubricated bearing surfaces are provided for rotation of the stud about its own axis and the stressed rubber bushing is provided for accommodating tilting movements of the stud in all planes.

Instead of using an inner bearing shell in the unit 22 for the joint construction of Figures 10 and 11, the bearing ring 51 can be directly vulcanized to the rubber 25 as shown in Figure 12. The usual outer bearing shell 23 is used but the usual inner shell 24 is replaced with the bearing ring 51.

From the above descriptions it will be clearly understood that the invention provides various forms of joints all having automatic wear take-up features provided by a resilient bushing material which, in most instances, also accommodates tilting movements of the bearing parts through interparticle flow thereof. However, as is clearly evident from the modification in Figures 5 and 7, both tilting and rotating movements can be accommodated on a cooperating pair of metal bearing surfaces. The stressing of the resilient bushing by a closure plate, in accordance with this invention, obviates the necessity for usual spring wear take-up device.

The resilient bushing is loaded and has a rather limited thickness between the above described shells to eliminate the soft or mushy steering effects usually produced by rubber bushed steering assembly joints. However, a sufficient amount of rubber is provided in the joints to absorb road shock.

It will, of course, be understood that various details of construction may be varied through a wide range without departing from the principles of this invention and it is, therefore, not the purpose to limit the patent granted hereon otherwise than necessitated by the scope of the appended claims.

I claim as my invention:

1. A joint construction comprising a socket having a fragmental spherical inner bearing wall, a bushing unit having a fragmental spherical outer bearing wall seated on the inner bearing wall of the socket, a stud member having a bearing wall disposed in said socket and converging in the same general direction as the fragmental spherical inner wall of the socket, said bushing unit having an inner bearing wall receiving said bearing wall of the stud in relatively rotatable relation, said bushing unit having a resilient member between the bearing walls thereof, and a closure plate for said socket cooperating with said stud to stress said resilient member to maintain the bearing walls in proper bearing engagement.

2. A joint construction comprising a housing defining a socket chamber with an enlarged opening at one end thereof and an inwardly converging bearing wall at the other end thereof terminating in a reduced opening, a stud member having a headed portion seated in said chamber and a shank portion extending through said reduced opening, a bushing unit composed of inner and outer bearing shells and an intermediate rubber body vulcanized to said shells receiving the stud head portion in rotatable relation on the inner shell and having the outer shell seated in tiltable relation on the bearing wall of the housing, said outer shell converging in the same direction as said converging bearing wall of the housing, and a closure plate fixed in the large open end of the socket for acting on the stud to load the rubber body and maintain the same under stress whereby the bearing shells of the bushing unit are constantly urged into proper bearing engagement with the housing bearing wall and the stud head respectively.

3. A joint construction comprising a housing defining a socket chamber with a large open end, a bearing wall portion and a reduced opposite open end, a stud having a bearing head disposed in said socket chamber and a shank projecting freely through the reduced open end of the chamber, a bushing unit composed of a rubber body member with rigid inner and outer shells vulcanized thereto, said unit being interposed between the stud head and the bearing wall portion of the housing with the inner shell rotatably receiving the bearing head of the stud and the outer shell being tiltably mounted on the bearing wall portion of the housing, said bearing head of the stud, inner and outer shells of the bushing unit, and bearing wall portion of the housing all converging in the same general direction toward the reduced open end of the housing, a closure plate for the large open end of the housing, and a cap member carried by the closure plate receiving a portion of said stud in tiltable and rotatable relation for urging the stud head toward the reduced open end of the housing and in the direction of convergence of the bearing head, the bearing wall of the housing, and the shells, to load the rubber body member for maintaining the shells in proper bearing engagement with the housing bearing wall portion and the stud head respectively.

4. A tie rod type joint comprising a housing defining an open ended socket chamber with an inwardly converging bearing wall at one end thereof terminating in a reduced opening to the chamber, a stud member having a bearing portion in said socket chamber and a shank portion projecting freely through said reduced opening, a rubber bushing unit composed of a rubber body member and inner and outer fragmental spherical rigid bearing shells vulcanized thereto, said unit being interposed between the stud bearing portion and the bearing wall of the housing, said inner shell rotatably receiving said bearing portion of the stud, said outer shell being tiltable on said converging bearing wall of the housing, and a closure cap for one open end of the socket chamber acting on the stud to load the rubber body member for maintaining the bearing shells of the bushing unit in proper bearing engagement with the bearing portion of the stud and the bearing wall of the housing respectively.

5. In a tie rod type joint, a cup shaped housing having an opening therethrough and an internal bearing wall, a stud member having a head portion disposed in said housing providing a bearing wall and a shank portion extending through said opening, a rounded button end on said stud disposed in said housing, a bearing unit composed of inner and outer bearing shells and an intermediate rubber body member fixed to said shells, said bearing unit being interposed between the head portion of the stud and bearing wall of the housing with the inner and outer shells thereof respectively engaging the bearing walls of said head portion and housing, a cap member having a depressed portion receiving the button end of said stud, and a closure plate for said housing holding said cap member against said button end of the stud to load the rubber body member of the bearing unit whereby the stud can rotate about its own axis through relative movement between a bearing shell of the bearing unit and an adjacent bearing wall and whereby the stud can tilt in all planes through interparticle flow of the rubber body member.

6. A ball and socket type joint comprising a housing defining an open ended socket chamber with an inwardly converging bearing wall on one end thereof terminating in a reduced opening to said chamber, a ball headed stud having the ball end thereof disposed in said socket chamber and having a shank extending freely through said reduced opening of the chamber, a pair of rubber bushing units each having a rubber body member and inner and outer semi-ball-shaped bearing shells fixed to the body member, one of said bushing units having the outer shell thereof seated on the bearing wall of the housing and having the inner shell thereof receiving a portion of the ball end of the stud adjacent the shank portion of the stud, the other of said bushing units having the inner shell thereof receiving the free end portion of the ball end of the stud, and a closure cap for said housing having a recess receiving the outer shell of said other bushing unit, said closure cap being forced into said housing to load the rubber body members of both bushing units for stressing the same whereby the ball stud can rotate and tilt in the housing on the inner bushing shells of the bearing unit and whereby the loaded rubber bodies of the unit will maintain the inner shells thereof in good bearing relation with the ball stud.

7. A tie rod type joint comprising a housing defining an open ended socket chamber with an inwarly converging bearing wall terminating in a reduced opening to the chamber, a stud member having a cylindrical bearing portion disposed in said chamber and a radially extending collar portion bottoming said cylindrical bearing portion, a rounded button end on said stud member under said collar portion, a bearing ring mounted around the cylindrical bearing portion of the stud and against said collar portion to provide a head portion on the stud, a rubber bushing unit composed of inner and outer metal bearing shells and an intermediate body member vulcanized thereto, said bushing unit being interposed between the bearing ring and the socket chamber bearing wall with the shells thereof in bearing engagement therewith, and a closure cap for said socket chamber acting against said button end of the stud member to deform the rubber bushing unit for holding the bearing shells in good bearing relation with the respective cooperating parts.

8. A tie rod type joint comprising a housing defining an open ended socket chamber with an inwardly converging bearing wall terminating in an opening of reduced size, a stud projecting freely through said opening of reduced size and having an outwardly flaring bearing portion disposed in said socket chamber, a bearing ring disposed around said stud and bottomed on said outwardly flaring portion of the stud, a reduced rounded button end on said stud beneath the outwardly flaring portion thereof, a bushing unit composed of a rubber body member and inner and outer metal bearing shells vulcanized thereto interposed between the bearing ring and the inwardly converging bearing wall of the socket, a cap member having a rounded depression receiving the button end of the stud, and a closure plate for the socket chamber urging said cap member against the stud to load the rubber body member and maintain the bearing shells in good bearing relation with the bearing ring and the socket chamber bearing wall.

9. A tie rod type joint comprising a bushing member having an inner bearing ring and a rubber body member vulcanized thereto, a stud extending through said inner bearing ring and seating thereon in bearing relation, a housing member receiving the rubber body member, lubricating passages through said stud for lubricating the inner bearing ring, and a closure plate for said housing member acting on said stud to load the rubber body member for holding the bearing ring in good bearing relation with the stud.

ANTHONY VENDITTY.

REFERENCES CITED

The following references are of record in the file of this patent:

UNITED STATES PATENTS

| Number | Name | Date |
| --- | --- | --- |
| 2,096,557 | Peo | Oct. 19, 1937 |
| 1,452,693 | Lord | Apr. 24, 1923 |
| 1,759,430 | Benjamin | May 20, 1930 |
| 1,300,023 | Riegel | Apr. 8, 1919 |
| 2,071,341 | Hufferd et al. | Feb. 23, 1937 |
| 2,189,266 | Klages | Feb. 6, 1940 |
| 2,205,981 | Klages | June 25, 1940 |
| 2,110,561 | Stephens | Mar. 8, 1938 |
| 2,009,401 | Hufferd et al. | July 30, 1935 |
| 2,301,346 | Venditty | Nov. 10, 1942 |
| 2,328,330 | Edington | Aug. 31, 1943 |

FOREIGN PATENTS

| Number | Country | Date |
| --- | --- | --- |
| 709,337 | France | May 18, 1931 |